United States Patent
Bauer et al.

[19]

[11] Patent Number: 6,092,507
[45] Date of Patent: Jul. 25, 2000

[54] CONTROL ARRANGEMENT FOR A DIRECT-INJECTING INTERNAL COMBUSTION ENGINE

[75] Inventors: Hartmut Bauer, Gerlingen; Nikolaus Benninger, Vaihingen; Uwe Maienberg, Stuttgart, all of Germany

[73] Assignee: Robert Bosch GmbH, Stuttgart, Germany

[21] Appl. No.: 08/906,163

[22] Filed: Aug. 5, 1997

[30] Foreign Application Priority Data

Aug. 8, 1996 [DE] Germany .......................... 196 31 986

[51] Int. Cl.[7] .................................................. F02B 17/00
[52] U.S. Cl. ............................................ 123/430; 123/295
[58] Field of Search .................... 123/430, 295, 123/357, 358, 359

[56] References Cited

U.S. PATENT DOCUMENTS

| 4,784,098 | 11/1988 | Artman | 123/430 |
|---|---|---|---|
| 5,078,107 | 1/1992 | Morikawa | 123/295 |
| 5,170,760 | 12/1992 | Yamada | 123/295 |
| 5,211,147 | 5/1993 | Ward | 123/430 |
| 5,483,934 | 1/1996 | Stutzenberger . | |
| 5,553,579 | 9/1996 | Yoshida | 123/295 |
| 5,558,178 | 9/1996 | Hess et al. . | |
| 5,603,301 | 2/1997 | Sakurai | 123/430 |
| 5,666,916 | 9/1997 | Fujieda | 123/295 |

FOREIGN PATENT DOCUMENTS

| 4332171 | 3/1995 | Germany . |
|---|---|---|
| 60-030440 | 6/1985 | Japan . |
| 63-248938 | 1/1989 | Japan . |
| 5-289404 | 1/1994 | Japan . |

*Primary Examiner*—Carl S. Miller
*Attorney, Agent, or Firm*—Walter Ottesen

[57] ABSTRACT

The invention is directed to a control arrangement for a direct injected gasoline engine. A sensor detects at least one operating variable of the engine and an actuator adjusts the air supplied to the engine. A control unit switches the engine between a stratified charge mode of operation and a homogeneous mode of operation in dependence upon the one operating variable of the engine. The control unit drives the actuator so as to cause the actuator to undergo a defined displacement when the control unit switches between the modes of operation so that the torque of the engine is essentially the same before and after the switchover between the modes of operation.

15 Claims, 5 Drawing Sheets

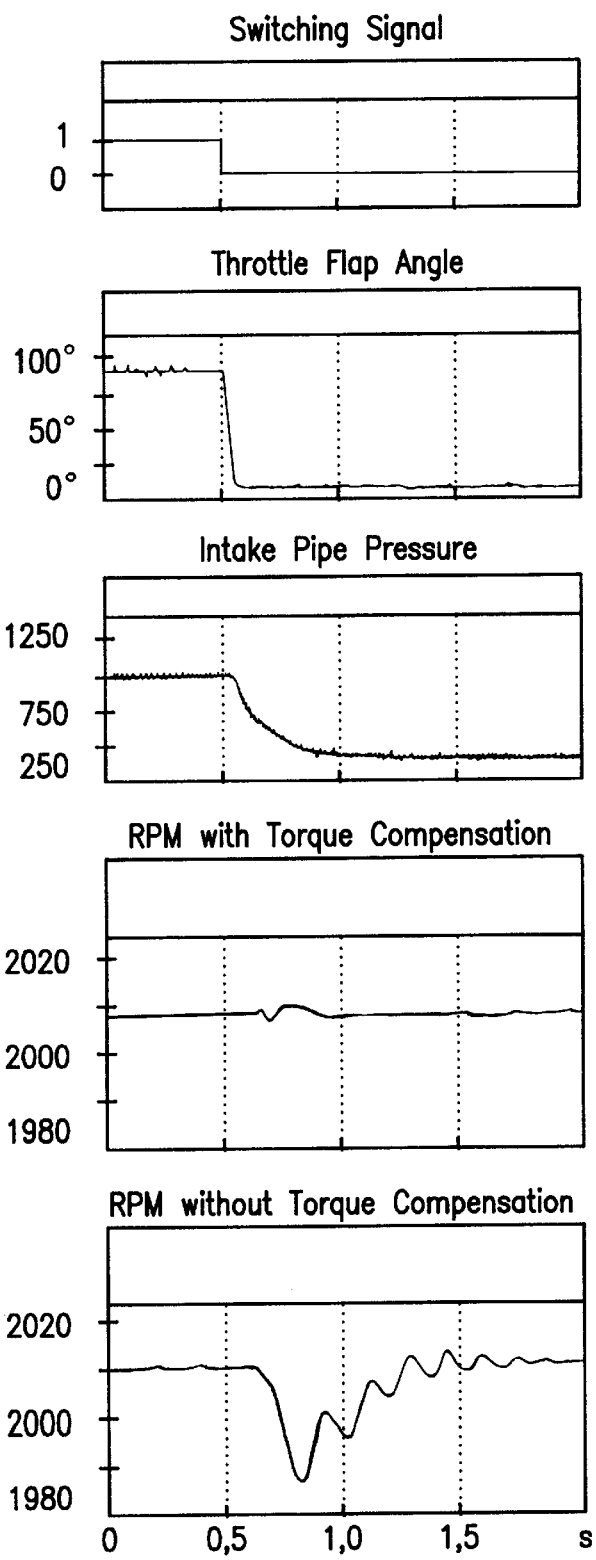
Observer Operating Point: RPM n ≅ 2000min$^{-1}$,
Constant Load torque M=40 Nm

CONTROL ARRANGEMENT FOR A DIRECT-INJECTING INTERNAL COMBUSTION ENGINE

BACKGROUND OF THE INVENTION

U.S. Pat. No. 5,483,934 discloses a method of operating a four-stroke internal combustion engine with externally supplied ignition and direct injection and an arrangement for carrying out the method. In FIG. 2 of this publication, the entire operating range of the engine is subdivided into different ranges according to rpm and load and, depending upon the actual operating range, fuel is either injected during the induction stroke or during the compression stroke. For the injection during the induction stroke, a substantially homogeneous fuel distribution (homogeneous operation) results because of the time available until the ignition as well as because of the turbulence of the injected fuel. On the other hand, in the case of the injection in the compression stroke, a stratified charge (stratified charge operation) occurs. In this known arrangement, an electronic control apparatus provides for the switchover between homogeneous and stratified charge operations based upon the individual operating variables and predetermined criteria and further determines the injection values.

U.S. Pat. No. 5,558,178 relates to a method and arrangement for controlling a vehicle. Interfaces are provided between different component systems of which one is an engine control system. Data is exchanged via these interfaces on the basis of torques to control the vehicle.

In German patent application 196 18 385, a control arrangement is disclosed for influencing the air supply to an internal combustion engine wherein a desired value is pregiven for the torque or the power of the engine at least on the basis of the driver command and this desired value is converted into a desired adjusting value for an actuator device influencing the air supply. In the conversion, corrective factors are considered for the influence of additional operating mean flows which cannot be influenced by the actuator device and/or which represent the pressure and temperature conditions in the intake pipe. From the torque desired value or power desired value, a desired value for the charge of the cylinders is formed while considering the engine rpm. From this charge, a desired value for the air mass flow for the air mass flowing into the cylinders is derived. Furthermore, an air mass controller or charge controller is provided which forms a corrective value from the desired air mass flow or the desired charging value in accordance with the corresponding actual value. The corrective value is superposed on the desired value and, in this way, forms the desired air mass flow at the intake pipe input. This desired air mass flow at the intake pipe input is corrected with additional air mass flows such as leakage air and/or the air mass flow via a tank-venting valve to form the desired air mass flow at the actuator device. This desired air mass flow at the actuator device is converted into a desired volume flow while considering the pressure condition forward of and rearward of the throttle flap and the pressure forward of the throttle flap and/or the temperature of the air forward of the throttle flap. A desired angle for the actuator device is derived from the desired volume flow in accordance with a pregiven characteristic line.

A control arrangement for a direct-injecting internal combustion engine is described in U.S. patent application ser. No. 08/812,633, filed Mar. 7, 1997. This control arrangement includes sensors for operating characteristic variables, a signal processing unit as well as actuating devices for at least fuel, fuel pressure, air mass and ignition and furthermore includes the possibility of an operation of the fuel injection in the stratified charge or homogeneous operations depending upon the operating range of the engine. Here, a desired engine torque is converted into a value for the fuel flow. A value for the air mass flow is determined from this value for the fuel flow. The injection time values are adjusted in dependence upon the fuel flow depending upon stratified charge operation or homogeneous operation and the throttle flap position is adjusted depending upon the air mass flow. For the conversion of the engine torque into the fuel mass flow value, at least the rpm as well as an efficiency signal of the engine, which is dependent upon the operation present (stratified charge operation, homogeneous operation) is utilized. The efficiency is then obtained from the torque/rpm characteristic fields in dependence upon the particular mode of operation (stratified charge/homogeneous).

Stratified charge/homogeneous operation in the context of direct injected gasoline engines is discussed also in the SAE Paper 970624 of G. Karl et al entitled "Analysis of a Direct Injected Gasoline Engine".

Engines with gasoline direct injection are basically lean engines (that is, engines operated with a lean mixture). The advantage with respect to consumption results, inter alia, from a greatest possible unthrottled operation, that is, the lack of the losses at the throttle flap. Three operating states result for optimizing the consumption while, at the same time, controlling the combustion, and therefore the emissions, as well as making adequate power available:

1. extremely lean operation with charge stratification via late injection of fuel;
2. moderately lean operation with homogeneous air/fuel mixture; and,
3. stoichiometric operation with throttling.

The change between these operating states (which should occur very rapidly because of emission reasons) is however problematic with reference to the relationship between accelerator pedal and torque because, at the switchover point, a change of the engine torque results which is not wanted by the driver (dependency of torque on the air/fuel ratio).

SUMMARY OF THE INVENTION

It is an object of the invention to provide suitable measures for controlling the switchover operation between the modes of operation via which a simple switching strategy is provided which can be carried out with a high level of comfort and/or be richly varied.

The control arrangement of the invention is for a direct injected gasoline engine and includes: sensor means for detecting at least one operating variable of the engine; an actuator for adjusting the air supplied to the engine; a control unit for switching the engine between a stratified charge mode of operation and a homogeneous mode of operation in dependence upon the one operating variable of the engine; and, the control unit including means for driving the actuator so as to cause the actuator to undergo a defined displacement when the control unit switches between the modes of operation so that the torque of the engine is essentially the same before and after the switchover between the modes of operation.

The solution provided by the invention controls the switchover between stratified charge operation and homogeneous operation.

It is especially advantageous that the switchover takes place without significant jumps in torque. In this way, driving comfort is improved in an advantageous manner.

It is especially advantageous that the switchover is carried out essentially by influencing the desired value for the throttle flap angle so that a realization of the solution according to the invention can make use of already available equipment for adjusting the throttle flap.

The exhaust-gas temperature in stratified charge operation is lower than in homogeneous operation. In this way, in some circumstances, there can be a drop below the operating temperature of a three-way catalytic converter. The switchover affords the possibility to increase the exhaust-gas temperature in selected operating states. By varying the switchover, a three way catalytic converter can again be brought to the operating temperature.

An optimal switchover makes possible the use of a NOx catalytic converters without reducing driving comfort. For clearing the NOx storage catalytic converter, homogeneous operation at defined lambda (preferably lambda less than 1) is necessary.

A further advantage of the switchover is that in the load states, which are suitable for the stratified charge operation, a switchover can be made at any time without difficulty in order to activate the tank venting which is preferably carried out in homogeneous operation.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
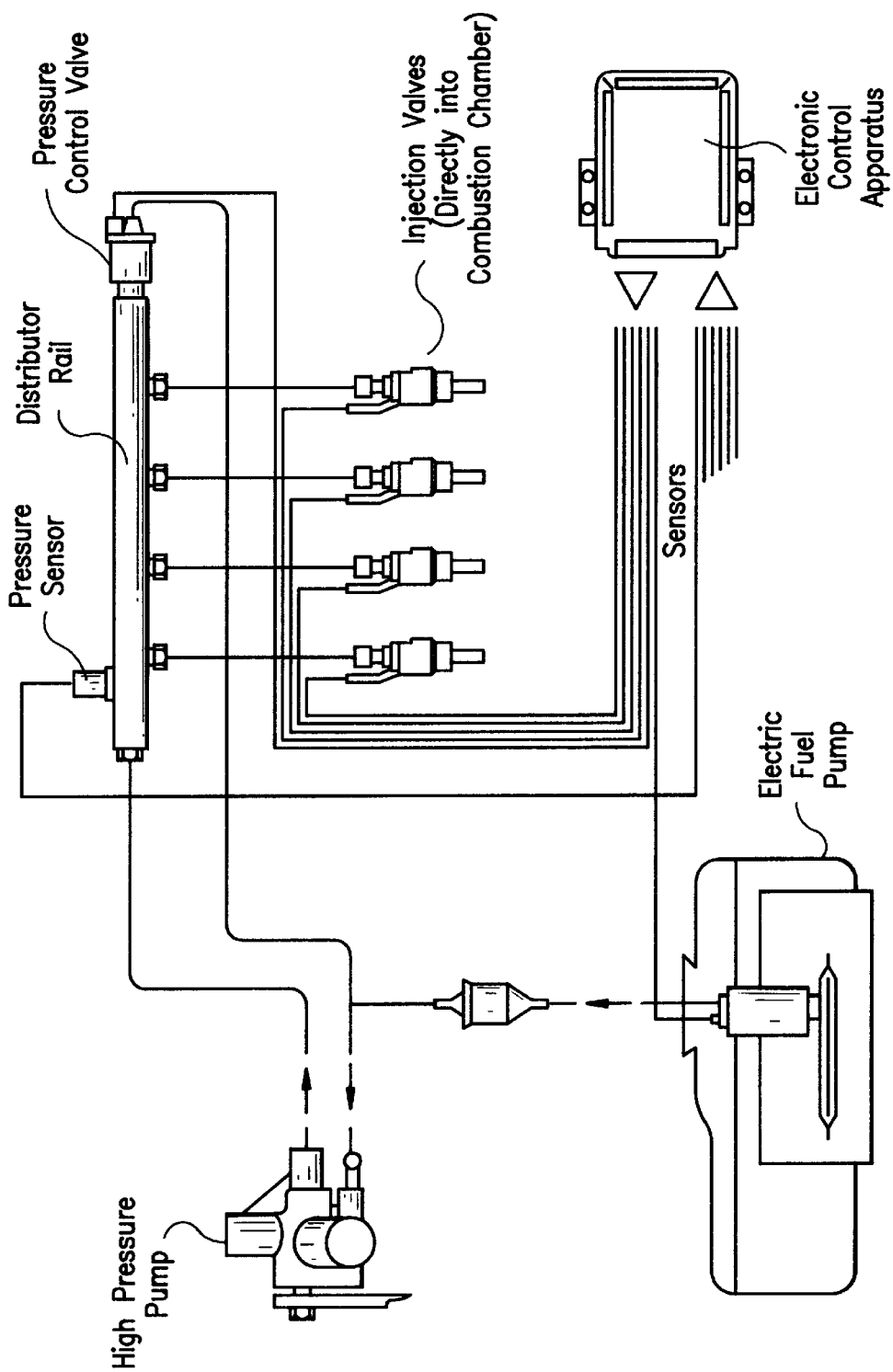
FIG. 1 shows a system arrangement of a common rail system for a direct injecting gasoline engine.

FIG. 1 shows the system arrangement of a common rail system for a direct-injecting gasoline engine. The injection valves project into the combustion chamber and are controlled by an electronic engine control apparatus via drive lines. Fuel is supplied to the valves via corresponding lines from a distributor rail in which a controllable changeable pressure is present. This pressure is detected by a sensor, is supplied to the electronic control apparatus and is adjusted by the control apparatus via a pressure control valve. The pressure in the rail is generated by a high-pressure pump. The fuel is pumped into the distributor rail by an electric fuel pump controllable by the control apparatus. An electrically controllable throttle flap (not shown) is actuated by the control apparatus and is mounted in the air intake pipe of the engine. The control apparatus adjusts the injection times, the throttle flap position, the pressure in the distributor rail and the ignition angle as known from the above-mentioned state of the art in accordance with operating variables which are determined via various sensors.

What is essential is that the initially-mentioned problematic is countered by the solution of the invention in that the torque change (caused by the change of the air/fuel ratio) is compensated via a corresponding change of the charge by utilizing an electro-motoric throttle flap and the decoupling provided thereby between the accelerator pedal and the throttle flap. For the sake of clarity, a direct changeover from lean stratified charge operation to stoichiometric homogeneous operation is discussed below (see FIG. 2).

Figure 2:
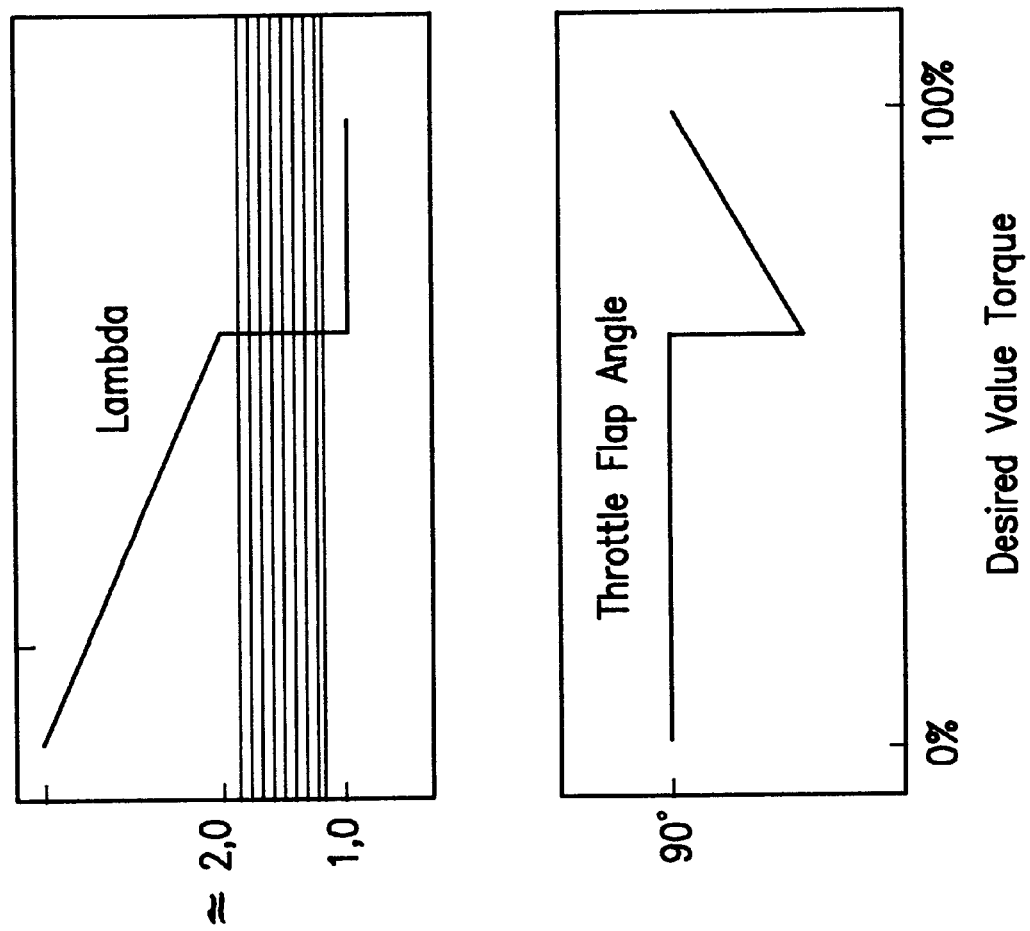
FIG. 2 shows the trace of the air/fuel ratio and the throttle flap position as a function of the torque desired value for a preferred embodiment of the invention.

FIG. 2 shows the switchover between stratified charge operation and homogeneous operation. The engine is essentially operated unthrottled (throttle flap position, for example, constant at 90°) in extreme lean operation with charge stratification by late injection of fuel up to a specific desired torque value. Then, there is a switchover to stoichiometric operation with throttling and an essentially homogeneous air/fuel mixture (or even to lean operation with essentially homogeneous mixture).

During stratified charge operation, the air charges of the respective cylinders is of no consequence for the torque and the air/fuel ratio which results must only be held above a pregiven threshold; however, the stoichiometric operation requires metering of the fuel in dependence upon the inducted air mass. In the transition, and to avoid torque changes, the throttle flap is shifted abruptly to a value which makes available the torque (as a rule pregiven by the driver), which had been adjusted in stratified charge operation, also in the stoichiometric operation. By compensating the torque change based on the abrupt change of lambda by varying the charge with an electrically actuable throttle flap, on the one hand, an emission end unfavorable value range for the air/fuel ratio lambda is avoided while, on the other hand, a continuous relationship between accelerator pedal and torque over the entire desired torque range (driver desired range) is obtained.

Figure 3:
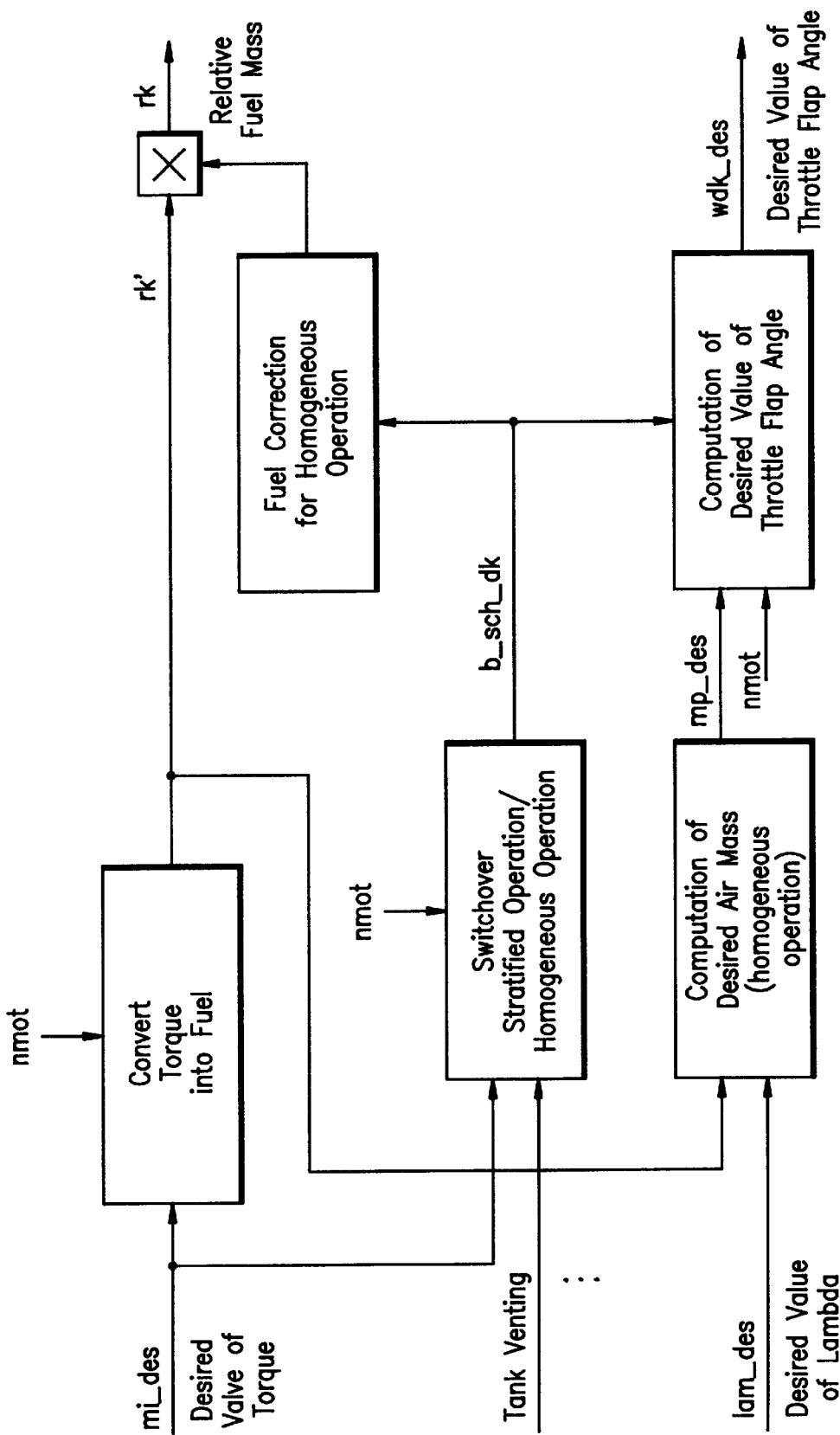
FIG. 3 shows the basic procedure with respect to a preferred embodiment for the switchover between stratified charge operation and homogeneous operation.

FIG. 3 shows a functional block diagram for the performance required in FIG. 2. In the preferred embodiment, the individual blocks define programs of a microcomputer wherein the operations described result when the programs are carried out.

The torque desired value mi_des is supplied as in the initially-described state of the art and is dependent at least upon the driver command. This torque desired value mi_des is supplied to a program for converting the desired torque into fuel as well as to a program for determining the switchover between stratified charge operation and homogeneous operation. The conversion of the torque into a fuel mass takes place while considering the rpm and the corresponding efficiency (stratified operation/homogeneous operation). The switchover takes place in dependence upon the additional binary signal b_sch_dk which defines the switchover signal between the modes of operation.

The switchover signal is influenced in dependence upon the desired torque (when a threshold value is exceeded), on a load/rpm characteristic field and/or on functions such as tank venting, exhaust-gas feedback, requirements of the catalytic converter (lean catalytic converter, NOx catalytic converter, three-way catalytic converter), et cetera. For example, a switchover to homogeneous operation is made when the desired torque exceeds a pregiven threshold value, that is, the driver commands a higher torque output. In the program "computation desired air mass for homogeneous operation", a desired air mass mp_des is determined from the fuel mass or the desired torque while considering the desired value lam_des for the air/fuel ratio. The desired value lam_des then defines a factor with which the fuel mass value is to be multiplied so that the desired ratio results (in homogeneous operation) via the adjustment of the air supply for a given fuel mass.

It is understood that other constants are considered which describe the conversion of a fuel mass into an air mass. The air mass desired value mp_des is supplied to a program "computation desired value throttle flap angle" which is shown in greater detail in FIG. 4 and a desired value wdk_des for the throttle flap position is determined while considering the switch signal b_sch_dk. This desired value is then adjusted, for example, in the context of a position control loop.

The fuel mass (relative fuel mass rk') is determined from the desired torque and the rpm and includes preferably the steady-state efficiency differences between the two operating modes (as shown in the initially-mentioned state of the art) proceeding from torque/rpm characteristic fields. This fuel mass is corrected in a correcting position (for example, multiplication position) by a corrective value for the homogeneous operation. This corrective value is formed in dependence upon the switch signal b_sch_dk and the time or number of work strokes since the switchover time point from stratified charge operation into the homogeneous operation. The component module "fuel correction for homogeneous operation" considers the known charging and emptying operation in the intake pipe which occur during transient operations (that is, especially for the switchover described here). The switch signal b_sch_dk can also be used by other function modules which exhibit a dependency on the type of mixture input (for example, ignition, lambda control, tank venting, et cetera). This is described for the ignition in the initially-mentioned state of the art. There, the ignition angle is changed depending upon the mode of operation. In homogeneous operation, conventional strategies are used; whereas, for charge stratification, a matching of the ignition angle to the computed end of injection takes place.

Figure 4:
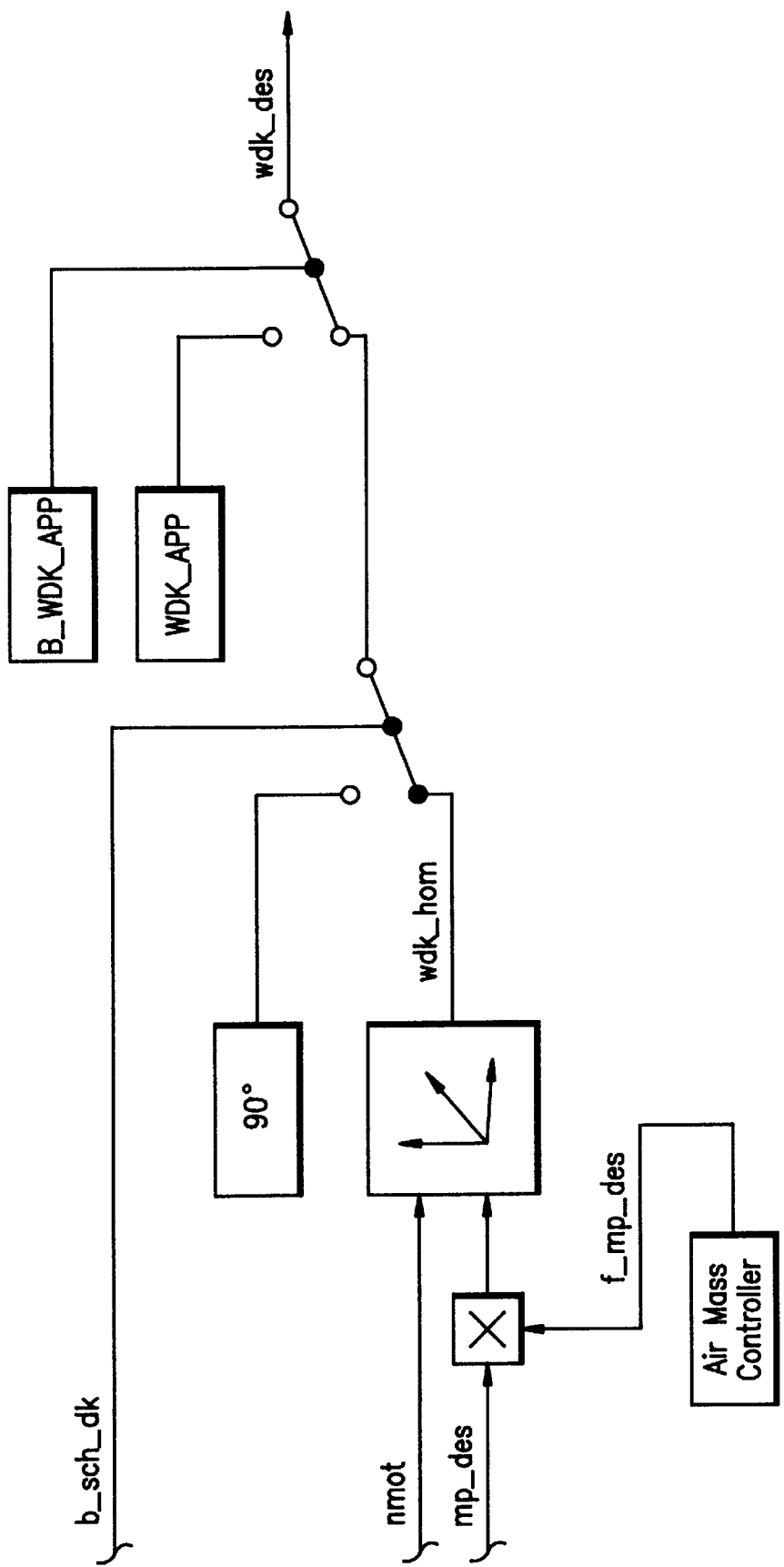
FIG. 4 is a block diagram for computing a desired value of the throttle flap angle; and, FIG. 5a to 5e show the time-dependent traces of relevant signals for the application of the solution of the invention.

A block diagram for the component function "computation desired value throttle flap angle" is shown in FIG. 4.

The throttle flap angle is switched over between the value for stratification (for example at full opening of, for example, 90°) and an air mass-dependent value wdk_hom for homogeneous operation in dependence upon the binary switchover signal b_sch_dk (see FIG. 3). This value is determined from a characteristic field in dependence upon the desired air mass mp_des (see FIG. 3) and the rpm. Faults in this characteristic field are compensated by the position signal of an air mass controller. The air mass controller forms a corrective signal f_mp_des for the desired air mass in dependence upon the difference between desired air mass and actual air mass. This corrective signal is then superposed on the desired value mp_des, preferably by means of multiplication.

Also, additional factors can be considered as described in the initially-mentioned state of the art. These additional factors include the influence of a tank-venting function, leakage air, the pressure and temperature conditions in the intake pipe, et cetera. The desired value of the throttle flap angle wdk_des corresponds to the desired value wdk_hom in homogeneous operation and corresponds for stratification preferably to a fixed value of, for example, 90° whereat the engine is almost unthrottled. For application purposes, this desired value wdk_des of the throttle flap angle can be switched over to a fixed value wdk_app. This takes place in dependence upon a switch signal b_wdk_app which can be applied for application purposes.

FIGS. 5a to 5e show the typical signal traces as a function of time. The engine is first operated with stratification. At a specific time point, a switchover to homogeneous operation (see FIG. 5a) takes place. The throttle flap angle, which has up to now been at 90°, is reduced abruptly (see FIG. 5b). The intake pipe pressure however drops slower (see FIG. 5c). The rpm trace is essentially constant in the region of the switchover. Considerable improvements are obtained (see FIGS. 5d and 5e) while considering the fuel correction during transition into the homogeneous operation.

In the embodiment above, a switchover from unthrottled operation into an operation having a stoichiometric mixture is described. In other embodiments, a switchover from operation with stratified charge to an operation with lean operation with an essentially homogeneous mixture takes place. Here, the same procedure is utilized. The throttle flap is automatically so adjusted that the desired ratio is set by considering the desired value lam_des for desired air mass formation.

In another embodiment, in the operation with stratification, the throttle flap angle is not set to 90°; instead, other values are set in dependence upon operating variables as may be required. These values are, as a rule, so selected that the engine is operated almost unthrottled.

The corresponding performance results in the opposite situation, that is, when there is a switchover from homogeneous operation into stratified charge operation.

In addition to the desired torque value, a desired value for the power of the engine is pregiven in another embodiment.

It is understood that the foregoing description is that of the preferred embodiments of the invention and that various changes and modifications may be made thereto without departing from the spirit and scope of the invention as defined in the appended claims.

What is claimed is:

1. A control arrangement for a direct injected gasoline engine, the control arrangement comprising:

sensor means for detecting at least one operating variable of said engine;

an actuator for adjusting the air supplied to said engine;

a control unit for switching said engine between a stratified charge mode of operation and a homogeneous mode of operation in dependence upon said one operating variable of said engine; and, said control unit including means for driving said actuator so as to cause said actuator to undergo an abrupt defined displacement thereby abruptly changing the amount of air supplied to said engine when said control unit switches between said modes of operation so that the torque of said engine is essentially the same before and after the switchover between said modes of operation.

2. The control arrangement of claim 1, wherein said actuator is an electrically actuable throttle flap.

3. The control arrangement of claim 2, wherein the desired value for said actuator is adjusted in a defined manner for said switchover.

4. The control arrangement of claim 3, wherein, with said switchover, said actuator is adjusted from a first value during stratified charge operation to a desired value derived from the command of the driver.

5. The control arrangement of claim 4, wherein a desired torque value mi_des is formed at least from said driver command.

6. The control arrangement of claim 5, said control unit including means for forming a value for the fuel mass to be injected from the desired torque value mi_des; and, means for forming a value for the air mass from said value of said fuel mass while considering the desired air/fuel ratio.

7. The control arrangement of claim 1, said control unit including means for forming a value for the fuel mass to be injected from the desired torque value mi_des while considering the rpm and the desired air/fuel ratio.

8. The control arrangement of claim 2, said control unit including means for forming a desired value for said throttle flap angle during said homogenous operation from the desired value for the air mass.

9. The control arrangement of claim 1, wherein said engine is driven almost unthrottled in said stratified charge operation.

10. The control arrangement of claim 2, wherein said throttle flap is at a pregiven angle during stratified charge operation.

11. The control arrangement of claim 10, wherein said angle is 90°.

12. The control arrangement of claim 1, wherein the following are corrected: the fuel quantity to be injected and/or the ignition angle in homogenous operation while considering the difference in efficiency and/or the discharge operation and charging operation of the intake pipe.

13. The control arrangement of claim 1, wherein the switchover takes place in dependence upon the desired torque.

14. The control arrangement of claim 1, wherein the compensation of the higher torque during the switchover operation from said stratified charge operation to said homogeneous operation is utilized to increase the exhaust gas temperature.

15. The control arrangement of claim 14, wherein said compensation is utilized to heat a three-way catalytic converter.

* * * * *